United States Patent
Zhou et al.

(10) Patent No.: US 6,791,911 B1
(45) Date of Patent: Sep. 14, 2004

(54) MOTION CONTROL SYSTEM FOR A CD CAROUSEL LOADER USING A BRAKING CIRCUIT

(75) Inventors: Feng Shaun Zhou, Guangzhou (CN); Nan Rong, NanNing GuangXing (CN)

(73) Assignee: Thomson Licensing S. A., Boulogne-Billancourt (FR)

( * ) Notice: Subject to any disclaimer, the term of this patent is extended or adjusted under 35 U.S.C. 154(b) by 0 days.

(21) Appl. No.: 09/980,737

(22) PCT Filed: Apr. 17, 2000

(86) PCT No.: PCT/EP00/03452

§ 371 (c)(1),
(2), (4) Date: Oct. 23, 2001

(87) PCT Pub. No.: WO00/67254

PCT Pub. Date: Nov. 9, 2000

(30) Foreign Application Priority Data

Apr. 30, 1999 (CN) ........................ 99105351 A

(51) Int. Cl.$^7$ .............................................. G11B 21/08
(52) U.S. Cl. .................................................. 369/30.33
(58) Field of Search ...................... 369/30.33, 30.43, 369/30.5, 30.56, 30.62, 30.71, 30.79, 30.86, 30.91, 30.93

(56) References Cited

U.S. PATENT DOCUMENTS

| | | | | |
|---|---|---|---|---|
| 4,755,978 A | * | 7/1988 | Takizawa et al. | 369/30.94 |
| 5,146,451 A | * | 9/1992 | Kang | 369/270 |
| 5,235,579 A | | 8/1993 | Ross | 369/37 |
| 5,631,884 A | * | 5/1997 | Chun | 369/30.97 |
| 5,671,196 A | | 9/1997 | Yoshida et al. | 369/34 |
| 5,726,960 A | * | 3/1998 | Yoshida et al. | 369/30.3 |
| 5,848,033 A | * | 12/1998 | Park | 369/30.29 |
| 5,848,035 A | * | 12/1998 | Nakao | 369/30.33 |
| 5,854,776 A | | 12/1998 | Sakiyama | 369/36 |
| 5,892,737 A | | 4/1999 | Park | 369/33 |
| 5,898,649 A | * | 4/1999 | Park | 369/30.3 |
| 5,903,527 A | * | 5/1999 | Park | 369/37.01 |
| 6,005,831 A | * | 12/1999 | Park | 369/30.8 |
| 6,091,677 A | * | 7/2000 | Akiyama et al. | 369/30.93 |
| 6,163,511 A | * | 12/2000 | De Vries | 369/30.77 |
| 6,621,769 B2 | * | 9/2003 | Ochi | 369/30.33 |

FOREIGN PATENT DOCUMENTS

GB 2302983 1/1997

* cited by examiner

Primary Examiner—Tan Dinh
(74) Attorney, Agent, or Firm—Joseph S. Tripoli; Carlos M. Herrera; Patricia A. Verlangieri

(57) ABSTRACT

The invention relates to a motion control system for driving a motor-driven device precisely to a predetermined position in a short time. More particularly, this invention relates to a CD-carousel loader having a precise and short access to the next information medium. The object of the invention is to provide a motion control system for a platter of a CD carousel which requires little outlay and satisfies the requirements in respect of high positioning accuracy, short motion duration and self-locking. According to the invention, this object is achieved by means of a drive system comprising a motor driving circuit and a braking circuit having a common input terminal responsive to a pulse signal during a deceleration period in front of a predetermined position of the motor-driven device. The field of application of the invention is associated with apparatuses for the recording or for the reproduction of information with a device providing the scanning or recording system with the information medium by a platter of a CD carousel.

5 Claims, 3 Drawing Sheets

MOTION CONTROL SYSTEM FOR A CD CAROUSEL LOADER USING A BRAKING CIRCUIT

This application claims the benefit of Chinese patent application serial no. 99105351.6 filed Apr. 30, 1999, which is hereby incorporated herein by reference, and which claims the benefit under 35 U.S.C. § 365 of International Application PCT/EP00/03452, filed Apr. 17, 2000, which was published in accordance with PCT Article 21(2) on Nov. 9, 2000 in English.

FIELD OF THE INVENTION

The invention generally relates to a motion control system for driving a motor driven device precisely to a predetermined position in a short time. More particularly, this invention relates to a CD carousel loader achieving a precise and short access to the next information medium. The platter drive system is provided for an apparatus for the recording or an apparatus for the reproduction of information which uses a scanning device to read or store information or data in one or more tracks of a recording medium such as, for example, a CD, CD-ROM or DVD, an erasable CD or DVD.

BACKGROUND OF THE INVENTION

CD carousel-loader devices for the recording or for the reproduction of information or data in one or more tracks of a recording medium are generally known. In order to be able to access on a desired recording medium of the CD carousel with high accuracy and speed and with a short motion time, the carousel has to be controlled in a position which makes it possible to scan or to write on the recording medium. The carousel is driven by an electric motor via a gearwheel mechanism, and the motor is switched on and off via a so-called platter motor driver IC. In accordance with the requirements made of a drive system for a carousel loader in respect of positioning accuracy, speed and self-locking, use is made of gearwheel mechanisms driven by a pinion and having high transmission. Due to complex combination of mechanical and electrical structures and elements the platter often cannot be stopped at its position precisely for its inertia. It is well known to a person skilled in the art to reduce the speed of a device to control it more precisely to a desired position. However, such a method has the disadvantage that it needs more time to reach the target position and in addition a lavish expenditure formed by mechanical or electronic braking means is necessary to control the device into the desired position.

SUMMARY OF THE INVENTION

It is an object of the invention to provide a motion control system for driving a platter in a predetermined position which requires little outlay and satisfies the requirements in respect of high positioning accuracy, short motion time and self-locking.

This object is achieved by means of the features of the invention specified in the independent claims. Advantageous developments of the invention are specified in dependent claims.

One aspect of the invention is to configure a drive system for a CD-carousel loader in such a way that a high positioning accuracy and a high speed in the course of accessing on the recording medium as well as self-locking of the drive system are ensured with little outlay.

These requirements are met by means of a motion control system which includes a braking circuit which can be formed with just a switch means which is controlled by the same terminal for switching on and off the motor. Self-locking is achieved by the use of a transmission between driving motor and platter of the carousel.

The motion control system for a CD-carousel loader is constructed in such a way that a braking circuit is added to the platter motor driver IC and the circuit which supplies the motor as well as the braking circuit are controlled by a pulse signal during a short period in front of the target position of the platter. The motion control system having a braking circuit and which controling the motor by a pulse signal during a short period in front of the target position has the advantage that by changing the constant switch on signal to a pulse signal the number of revolutions of the motor and in such a way also the velocity of the platter will be decreased in a rapid manner and a target position will be very precise and reached fast when a stop signal has been received. Finally, a shorter decelerating distance can be used with braking and, nevertheless, there is no overreaching. That means that the total duration to reach precisely the desired position will be reduced. The mechanical motion system is precisely stopped in a short time without employing any mechanical braking.

Within a preferred embodiment, a photo—interrupter is used to detect the positions to start the deceleration and to stop the platter. Pulses to control the motor during the deceleration period are generated continuously by a central processor unit of the recording or reproduction device until the stop point is sensed.

The braking circuit is very simple, it only comprises a transistor, a resistor and a diode, hence, it achieves the braking result with cost advantage.

BRIEF DESCRIPTION OF THE DRAWINGS

The invention is explained more in detail below using an exemplary embodiment with reference to drawings, in which.

DETAILED DESCRIPTION OF THE PREFERRED EMBODIMENTS

Reference symbols are used in a manner such that they correspond throughout the drawings.

Figure 1:
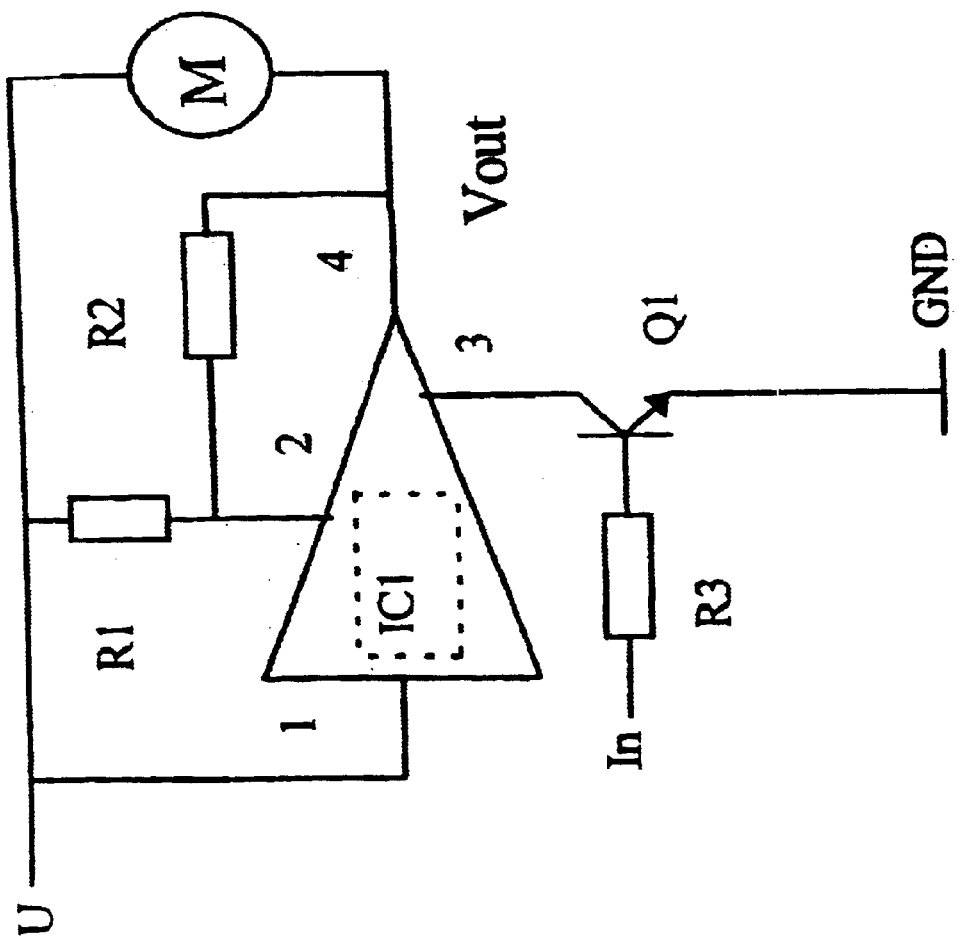
FIG. 1 shows a schematic circuit diagram of a platter motor driver IC known from the prior art.

The schematic circuit diagram of a platter motor driver IC, illustrated in FIG. 1, is known from the prior art and shows a driver circuit IC1 as for example AN6651 having four terminals 1 to 4, a first resistor R1 and a second resistor R2 to adjust the gain and the output voltage Vout of said driver circuit IC1 and an npn-transistor Q1 as electronic switch which controls a motor M running or stopping. The emitter of npn-transistor Q1 is connected to ground GND, the base of npn-transistor Q1 is connected to an input terminal In via a third resistor R3 and the collector of npn-transistor Q1 is connected to terminal 3 of driver circuit IC1. Terminal 1 of driver circuit IC1 forms an input of driver circuit IC1 and is applied to a power supply voltage U to which also a first terminal of the first resistor R1 and a first terminal of the motor M are applied. The second terminal of the first resistor R1 and a first terminal of the second resistor R2 are connected with the second terminal 2 of driver circuit IC1 and finally the second terminal of the second resistor R2 and the second terminal of the motor M are connected to the output terminal 4 of the driver circuit IC1. A typical power supply voltage U is 9V, and the voltage applied to input terminal In for running or stopping motor M has a high signal level of 5.3 V and a low signal level of 0 V. Such a platter motor driver circuitry has the disadvantage that the platter often cannot be stopped at its position precisely for its inertia due to complex combination of mechanical and electrical structures and elements. It is well known to a person skilled in the art to reduce the speed of a device to control it more precisely to a desired position. However, such a method has the disadvantage that it needs more time to reach the target position, and in addition a lavish expenditure formed by mechanical or electronic braking means is necessary to control the device into the desired position. It is, therefore, an object of the invention to provide a method and an arrangement to overcome the disadvantages of the known prior art.

Figure 2:
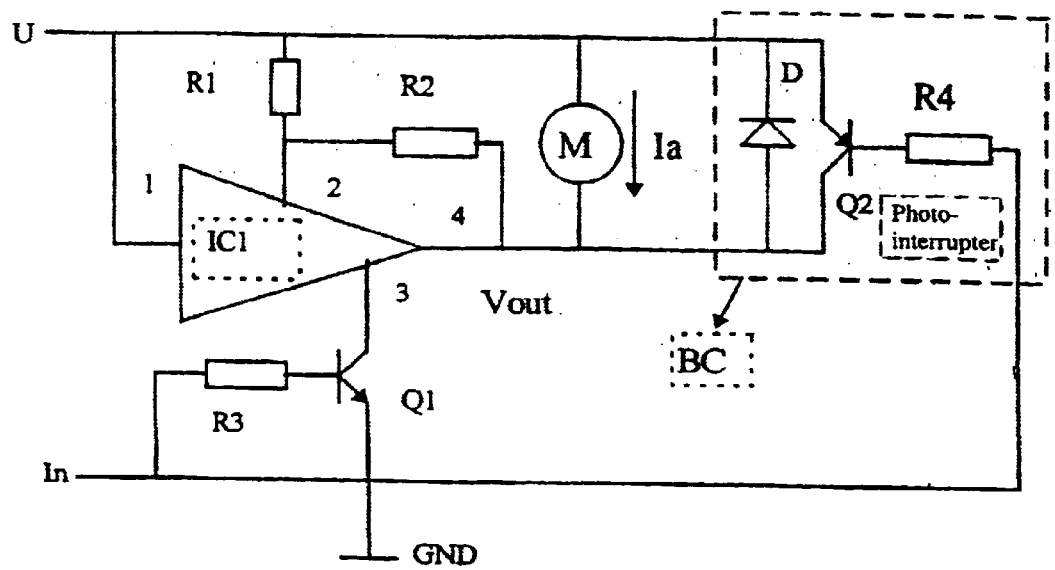
FIG. 2 shows a schematic circuit diagram of an embodiment of the motion control system according to the invention.
Figure 6:
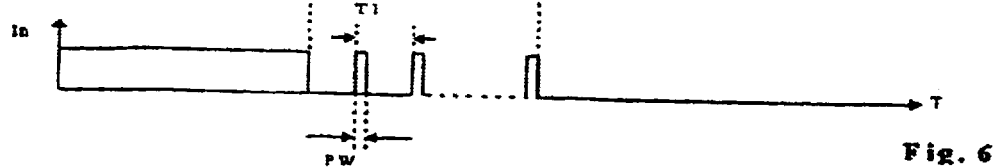
FIG. 6 shows a schematic illustration of an input signal applied to the motion control system.

The problem is solved by a motion control system as shown as an preferred embodiment in FIG. 2 and FIG. 6.

Figure 4:
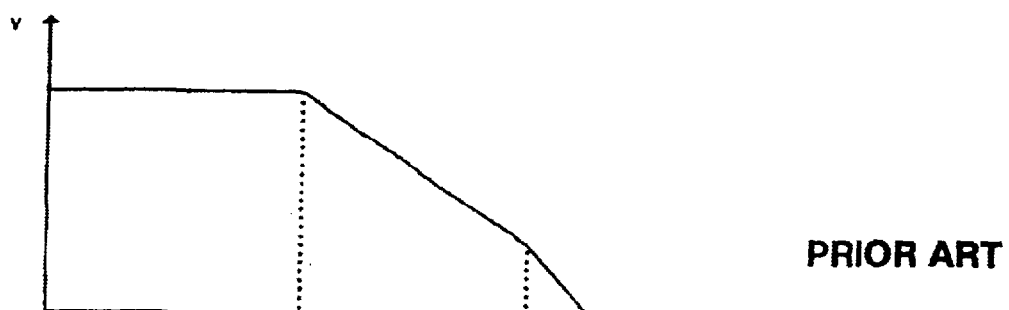
FIG. 4 shows a schematic illustration of the platter velocity and platter position without motion control system.

The motion control system is formed by a motor driver circuit having a braking circuit and being controlled by a pulse signal during a short period in front of the target position. The simultaneous pulse control of the driver circuit IC1 for motor M and a braking circuit BC for said motor M during a short period in front of the target position has the advantage that the motor armature voltage and in such a way also the velocity of the platter of the carousel is reduced very fast and the target position is precisely reached in a shorter time. That means, as it will be shown below, that in spite of a reduced speed in front the target position will be reached in a shorter time and in addition with a higher precision. This surprising effect is caused by the fact that due to the motion control system, the decelerating distance can be shortened and, nevertheless, the target position is reached with a high precision and without run out over the target position. As shown in FIG. 4, as an example, the platter of a selected carousel which is controlled by a circuit according to FIG. 1 and is stopped at a deceleration position A by changing the signal at input terminal In from a high level to a low level runs out over a target position B and stops at position C for a distance OD of 0.002 rad over the target position. The duration until the platter really stops after the stop signal has been applied to input terminal In according to FIG. 1 and has been measured to 500 ms. This result has been reached for a deceleration distance B–A of 0.0217 rad.

Figure 5:
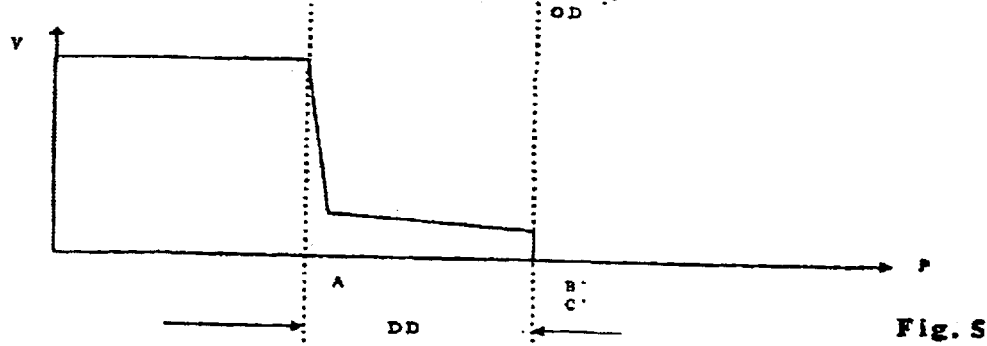
FIG. 5 shows a schematic illustration of the platter velocity and platter position with motion control system.

By using a motion control system according to FIG. 2, the target position B in FIG. 4 can be reached precisely as shown in FIG. 5. However, since the platter velocity V is decreased, the target position will be reached after an increased period of 1200 ms in this example under the condition that the deceleration starts from the same deceleration position A. That means that it concerns a case in which the deceleration start position A in FIG. 4 is equal to a deceleration position AR in FIG. 5.

In such a case, the requirement to reach the target position in a short or shorter time would not be fulfilled.

However, by using a motion control system according to FIG. 2 and FIG. 6, a target position B can be reached with the same precision as compared to FIG. 4, if the pulse-shaped deceleration signal according to FIG. 6 at input terminal In according to FIG. 2 is applied later as compared to FIG. 4. That means, the same precision is also reached if the deceleration distance B–A is reduced to a deceleration distance DD. For the tested sample, the deceleration distance DD could be reduced from 0.0217 rad to 0.006 rad. Consequently, also the duration until the platter stops from the new deceleration position AR is shorter and has been measured to 80 ms. That means that due to the fact that the deceleration period has been decreased from 500 ms to 80 ms, the target position with a higher precision will be reached in a shorter time. The access speed on the next information medium is increased.

The braking circuit BC, as shown in FIG. 2, is added to the known circuit according to FIG. 1 and comprises a pnp-transistor Q2 which is used as a switch means, a fourth resistor R4 and a diode D. The diode D and the collector—emitter path of pnp-transistor Q2 are arranged in parallel to the terminals of motor M, and the base of pnp-transistor Q2 is connected to input terminal In via resistor R4. In such a way, the motor driver circuitry and a braking circuit BC are controlled by the same input terminal In. The function of diode D is to avoid high voltage due to the inductance of the motor armature. The braking circuit BC according to FIG. 2 requires a low expenditure, hence, it achieves the braking result with cost advantage.

The npn-transistor Q1 is an electronic switch which controls motor running or stopping. When the logic level at input terminal. In is high, the collector—emitter path of npn-transistor Q1 is conductive, motor M is running, and when the logic level at input terminal In is low, the state of the collector—emitter path of npn-transistor Q1 is off and motor M is stopped. After the state of npn-transistor Q1 is changed from on to off, the motor is usually still rotating for a while due to mechanical inertia.

To stop motor M in a short time, a braking circuit is added. After the state of npn-transistor Q1 is changed from on to off, the state of pnp-transistor Q2 is changed from off to on, so the armature was short connected due to pnp-transistor Q2 being conductive. If the motor is still rotating, a braking current Ia is generated, and a torque in the armature is produced to prevent motor M from rotating.

A not shown photo—interrupter is used to detect the positions to start the deceleration and to stop the platter, and pulses to control motor M during the deceleration period are generated continuously by an also not shown central processor unit of the recording or reproduction device.

Figure 3:
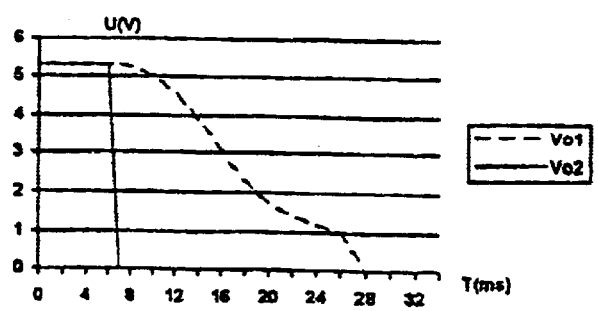
FIG. 3 shows a timing diagram corresponding to the motor armature voltages according to the circuits in FIG. 1 and FIG. 2.

Although there is used a driver circuit IC1 to control the motor M, the motor armature voltage Vo1, as shown in FIG. 3, not immediately turns down, if a brake signal of 0V is applied to the input terminal In. A voltage Vo1 is generated by the motor inertia after supplying a brake signal to the input terminal In and causes at least a current flow Ia through the first resistor R1 and the second resistor R2 with the result that the motor armature voltage Vo1 not immediately turns down if a brake signal of 0V is applied to the input terminal In. As shown in FIG. 3, the duration until the motor armature voltage Vo2 turns down to zero has been reduced for about 20 ms by using a braking circuit according to FIG. 2. However, the effect of a reduced access time for about 420 ms and an simultaneously improved precision has been achieved by said motion control system, which combines the use of a braking circuit BC with a pulse control during the deceleration period. In the embodiment as mentioned above, a pulse pause ratio of one to four has been used with a pulse width PW of 8 ms in a pulse distance T1 of 32 ms.

A high positioning accuracy is ensured by the reduced platter velocity in front of the target position and a run-out over the target position is avoided.

The exemplary embodiment specifies one advantageous configuration of the invention. However, the invention is not restricted to this exemplary embodiment but rather also includes the modifications which are familiar to a person skilled in the art.

What is claimed is:

1. Motion control system for driving a motor-driven carousel loader for recording media in order to access on a desired recording medium on said carousel loader at a target position with high accuracy and speed by a motor driving circuit controlling a motor to which a pulse signal is supplied wherein:

a motor driving circuit, comprising an electronic switch as well as a driver circuit, and a braking circuit are connected to said motor, said electronic switch and said braking circuit having a common input terminal to which a pulse signal is applied during a deceleration period of the carousel loader and wherein said deceleration period is determined by a deceleration position detected by a photo— interrupter and a target position of said carousel loader.

2. System according to claim 1, wherein an input of said driver circuit and a second terminal of said driver circuit are applied to a power supply voltage to which also a first terminal of said motor is applied, a second terminal of the motor is connected to an output of said driver circuit having a third terminal connected to said electronic switch connecting said driver circuit to ground for controlling said motor running via said common input terminal to which the braking circuit is connected to prevent the motor from rotating after the state of said electronic switch is changed from on to off.

3. System according to claim 1, wherein said braking circuit comprises a switch means for short-cutting the terminals of motor during pauses of said pulse signal.

4. System according to claim 3, wherein said switch means for short cutting the terminals of motor is formed by a collector—emitter path of a transistor having a base terminal connected via a resistor to an input terminal of the driver circuit.

5. Method for driving a motor-driven carousel loader for recording media in order to access on a desired recording medium on said carousel loader with high accuracy and speed by a motor driving circuit controlling a motor to which a pulse signal is supplied characterised in that a motion control system is provided wherein a constant switch on signal applied to a common input terminal of a motor driving circuit and a braking circuit which form said motion control system is changed to a pulse signal during a deceleration period in front of a target position of said carousel loader to reach said target position precise and fast.

* * * * *